No. 754,876. PATENTED MAR. 15, 1904.
G. C. LANEY.
GATE OPENER.
APPLICATION FILED SEPT. 2, 1903.
NO MODEL. 2 SHEETS—SHEET 1.
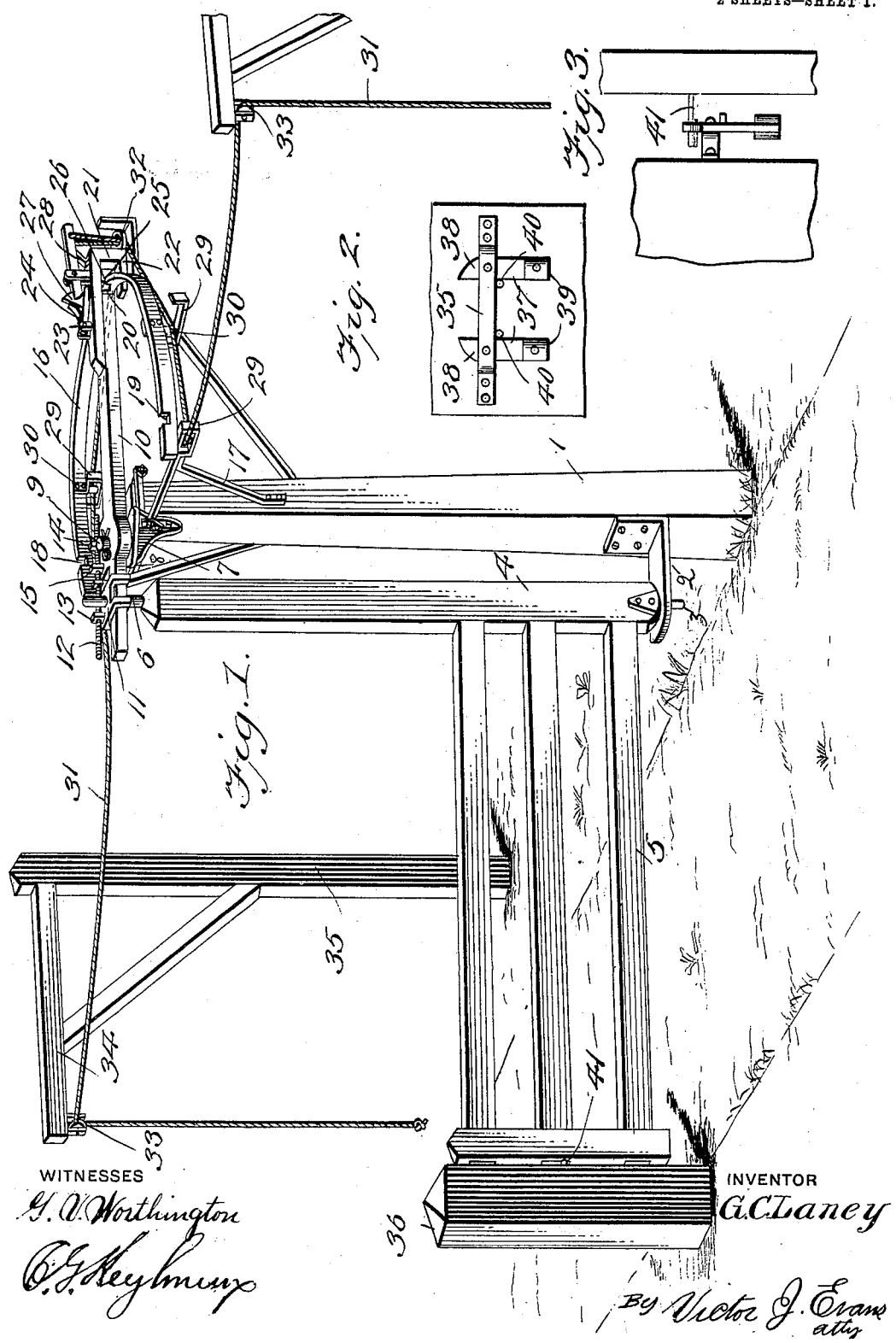
WITNESSES
G. V. Worthington
C. G. Keylmuy
INVENTOR
G. C. Laney
By Victor J. Evans
atty

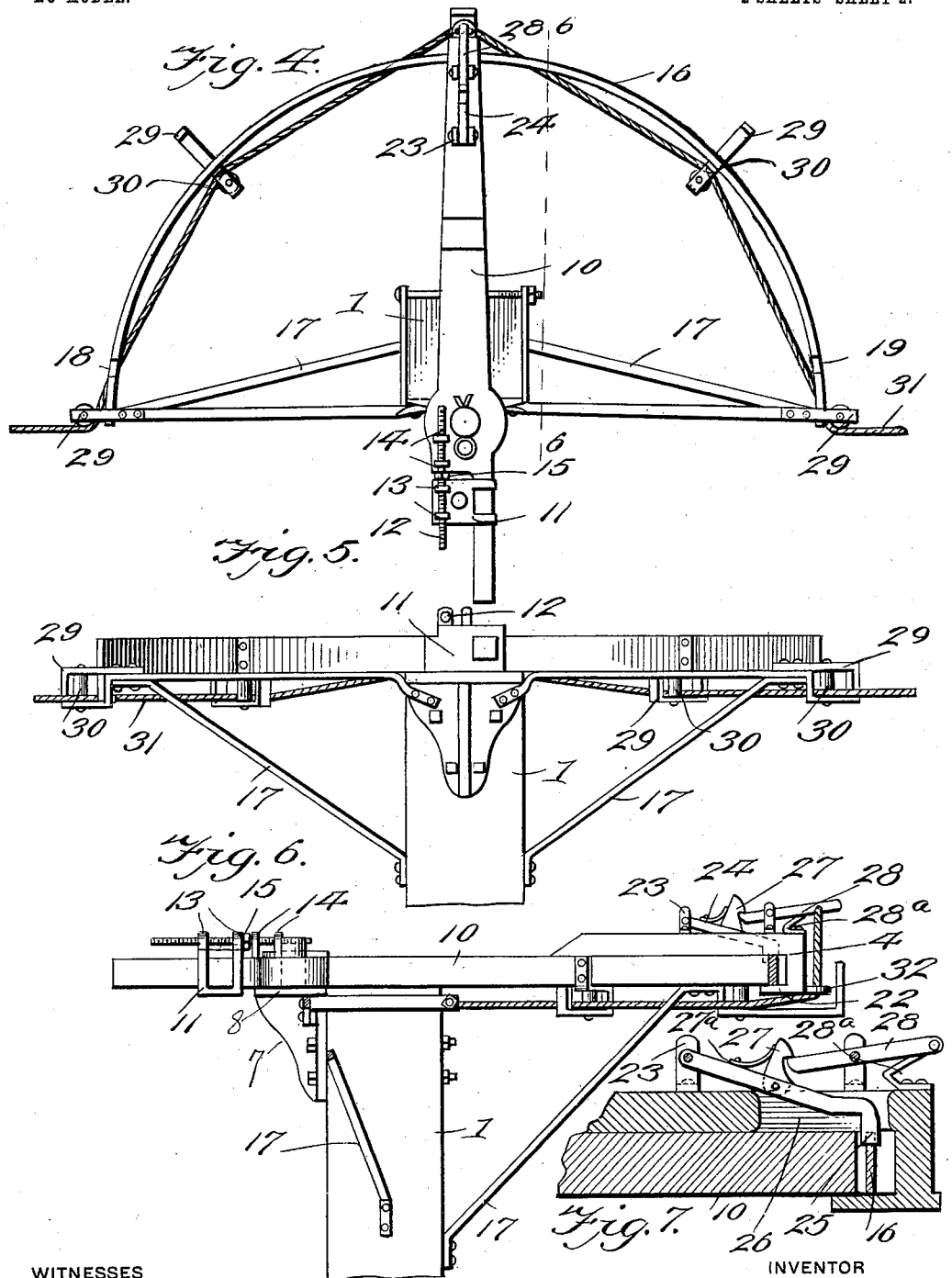

No. 754,876. Patented March 15, 1904.

UNITED STATES PATENT OFFICE.

GEORGE C. LANEY, OF KAMAS, UTAH.

GATE-OPENER.

SPECIFICATION forming part of Letters Patent No. 754,876, dated March 15, 1904.

Application filed September 2, 1903. Serial No. 171,665. (No model.)

*To all whom it may concern:*

Be it known that I, GEORGE C. LANEY, a citizen of the United States, residing at Kamas, in the county of Summit and State of Utah, have invented new and useful Improvements in Gate-Openers, of which the following is a specification.

My invention has relation to new and useful improvements in swinging gates, and more especially to the operating means for opening and closing the gate.

The primary object of the invention is to provide in combination with a swinging gate an improved and simplified operating means for opening and closing the same which can be actuated for the desired purpose at a point remote from the gate in order to obviate the necessity of dismounting from a vehicle when it is desired to open or close the gate.

A further object is to provide an improved locking means associated with the opening and closing means for the purpose of locking the gate in its opened and closed position.

The invention consists in providing in combination with a swinging gate an operating means embodying a lever which is adapted to be swung on its fulcrum to throw the hinges of the gate out of alinement in order that it will swing open, said lever carrying a locking device to engage with a lock-bar to hold the gate open or closed and an adjustable connection between the lever and the gate for the purpose of regulating the amount of leverage necessary to swing the gate.

I have fully and clearly illustrated the invention in the accompanying drawings, forming a part of the specification, and wherein—

Figure 1 is a perspective view of a gate and an operating means therefor embodying my invention. Fig. 2 is a view in front elevation of the latch for holding the gate closed. Fig. 3 is a side view of the gate-latch. Fig. 4 is a top plan view of the improved gate-operating means. Fig. 5 is a front elevation of the same. Fig. 6 is a section taken on the line 6 6 of Fig. 4. Fig. 7 is a detail sectional view taken through the means for locking the operating-lever in engagement with the curved track.

Referring to the drawings, 1 designates a gate-post of such material and dimensions as best adapt it to the purposes for which it is employed and upon which the swinging gate and its operating means are supported. Upon the post 1 adjacent its lower end is rigidly fastened a laterally-projecting bracket-plate 2, formed with a suitable bearing, in which is seated a bearing-spindle 3, carried upon one of the end bars 4 of the gate 5 and upon which the gate swings when opened or closed. This end bar of the gate is extended vertically for a distance above the top of the gate and is provided at its upper end with a centrally-arranged spindle 6, which, as hereinafter described, constitutes the upper bearing, upon which the gate swings.

Mounted upon the post 1 and upon the side adjacent the end bar 4 of the gate is a laterally-projecting bracket 7, carrying a horizontally-disposed plate 8, from which rises a vertical bearing pin or stud 9, upon which is fulcrumed the operating-lever 10, which moves upon and in contact with the plate 8.

The lever 10 above mentioned has one of its ends projecting well over the gate-bar 4 and carries a suitable bearing, in which the spindle 6 is located, while the other end is connected with an operating means for swinging the lever to open the gate. This bearing consists of a suitable block 11, which is slidably mounted on the lever 10 and which is provided with a bearing-aperture in which the spindle 6 is located and turns. The bearing-block 11 is adjustable lengthwise of the lever 10 by means of an oppositely-threaded bar 12, the ends of which engage threaded lugs 13 14, mounted upon the sliding bearing-block 11 and the lever 10, the said bar 12 being provided at its central portion with an angular section 15 for engagement with a suitable tool, by means of which the bar is turned. It will be seen that by adjusting the sliding block toward or away from the stud 9 the leverage necessary to swing the gate is regulated.

16 designates a curved or semicircular track supported at the upper end of the post 1 and adjacent the lever 10 by means of suitable brackets or supporting-bars 17. This track 16 is formed at its ends with notches or recesses 18 19 and with an intermediate notch or recess 20, which are adapted to be engaged by a latch carried by the operating-lever for the purpose of holding the gate in open or closed position, which latch will be more fully described hereinafter.

At its rear portion, or at the end opposite to that connected to the gate, the lever 10 is provided with a depending arm 21, having a lateral projection 22 extending under the track 16 and which is adapted to engage therewith to prevent vertical movement of the lever during the operation of swinging the gate. Arranged upon the upper face of the lever 10 is a pair of lugs 23, between which is pivoted a catch 24, formed with a depending toe 25, which projects through a slot 26, formed in the lever 10, and is adapted to engage within the notches or recesses 18, 19, and 20. This pivoted latch is provided with a hooked catch 27, pivotally mounted in said latch and which is adapted to be engaged by the end of a lifting-lever 28, fulcrumed upon the end of the lever 10, which lever 28 is operable for the purpose of lifting the latch 24 out of engagement with the notches in the semicircular track. This catch 27 is thrown forwardly into the path of the end of the lifting-lever 28 by means of a spring $27^a$, as shown in Fig. 7 of the drawings. Disposed between one end of the lever 28 and the lever 10 is an expansion bow-spring $28^a$, the function of which is to throw the opposite end of the lever downwardly to place it in engagement with the hooked catch 27 in order that the latch 24 may be lifted, said catch being held in engagement with the lever by means of the spring $27^a$.

At suitable intervals on the track 16 are disposed guide-eyes 29, in which are journaled antifriction-rollers 30 and through which extend oppositely-directed cables 31, which travel over the rollers 30, said cables passing through an eye 32 on the end of the lever 10 and connected to the lever 28, the opposite or free ends of the cables extending for some distance either side of the gate and passing over rollers 33, carried on the ends of arms 34, supported by posts 35. When it is desired to open the gate, the operator grasps the cable 31 upon that side of the gate which he is approaching and pulls said cable downwardly. The force exerted by the pull upon the cable throws the end of the lifting-lever 28 upwardly, which raises the catch 24 out of engagement with the intermediate recess 20 and releases the gate from its closed position. A continued pull on the cable throws the rear end of the lever 10 toward the operator, which moves the upper spindle of the gate out of alinement with the lower spindle, and the preponderance of the weight of the gate being thrown to one side of the lower spindle will swing the gate open in a direction away from the operator, said gate continuing its swinging movement until the catch 24 engages in one of the end recesses 18 19 in the track 16. In closing the gate the operator after passing through the gate grasps and pulls upon the cable which he is approaching, which serves to lift the catch 24 out of engagement with the end recess 18, and a continued pull throws the gate into closed position, where it is held by the engagement of the catch 24 with the intermediate recess 20.

In Figs. 2 and 3 is shown a simple and effective latch for preventing movement of the free end of the gate independent of the operating means, which movement would tend to strain or break said means if the catch 24 were not removed from engagement with the track 16. This latch comprises a bracket 35, mounted upon and spaced apart from the latch-post 36. In the space between the post and the bracket are pivotally disposed two latch-levers 37, the upper outer ends of which are formed with curved striker-surfaces 38 and the lower ends of which are weighted, as at 39, for the purpose of holding the levers in vertical position. To prevent movement of the latch-levers in one direction, I provide laterally-projecting pins 40 on the latch-post, which constitute abutments against which the latches strike. Upon the end of the gate is disposed a locking-pin 41, which when the gate is moved to its closed position strikes against the upper end of one of the levers 37, which swings on its pivot and permits the pin 41 to assume a position between the levers 37, where said pin 41 will be held, the pins 40 preventing the outward swing of the latch-levers.

It will be seen that when the operating-lever is manipulated to swing the gate in its primary movement the gate will be given a slight tilt which is sufficient to raise the pin 41 out of engagement with the latch-levers 37, whereby the free end of the gate is released from the latch-post.

Having thus described the invention, what is claimed as new is—

1. In a gate-operating means, the combination with a post and a gate pivoted thereto, of an operating-lever fulcrumed upon the post, and a bearing carried by said lever in which the gate is journaled, said bearing being movable with relation to the fulcrum of the operating-lever.

2. In a gate-operating means, the combination with a post and a gate pivoted thereto, of an operating-lever fulcrumed on the post, a bearing on the lever in which the gate is journaled, said bearing being shiftable with relation to the fulcrum of the lever, and means for shifting the said bearing.

3. In a gate-operating means, the combination with a post and a gate pivoted thereto, of an operating-lever fulcrumed on the post, and a bearing in which the gate is journaled, said bearing being slidably arranged upon the lever.

4. In a gate-operating means, the combination with a post and a gate pivoted thereto, of an operating-lever fulcrumed on the post, a bearing in which the gate is journaled, said bearing being slidably arranged upon the lever, and means for sliding the bearing.

5. In a gate-operating means, the combination with a post and a gate pivoted thereto, of a lever fulcrumed on the gate-post of a bearing in which the gate is journaled, said bearing being slidably mounted upon the lever, and an oppositely-threaded bar engaging the lever and bearing for adjusting said bearing with relation to the fulcrum of the operating-lever.

6. In a gate-operating means, the combination with a post and a gate pivoted thereto, of an operating-lever fulcrumed upon the post provided with a bearing in which the gate is journaled, a curved track supported by the post and provided with recesses, a latch pivotally mounted upon the lever and adapted to engage said recesses to hold the gate in open or closed position, a lifting-lever fulcrumed upon the operating-lever and engaging the latch to lift the same out of engagement with the recesses in the curved track, and means for operating said lifting-lever.

7. In a gate-operating means, the combination with a post and a gate pivoted thereto, of an operating-lever fulcrumed on the post, a bearing on the lever in which the gate is journaled, means for adjusting said bearing with relation to the fulcrum of the lever, projections upon said bearing and the lever, and an oppositely-threaded rod engaging said projections and by means of which the bearing is adjusted.

8. In a gate-operating means, the combination with a post, of an operating-lever fulcrumed upon the post and provided with a bearing in which the gate is journaled, a curved track, a locking means carried by the operating-lever and coöperating with said track, guides supported by said track, and a cable extending through said guide-eyes and connected to the lever and the locking means.

9. In a gate-operating means, the combination with a post and a gate pivoted thereto, of an operating-lever fulcrumed upon the post and operatively connected to the gate to swing the same, a curved track, a latch pivotally mounted at one end of the operating-lever and arranged to coöperate with the track to hold the gate in open and closed position, a lifting-lever engaging the latch and means to operate said lifting-lever to lift the latch and swing the operating-lever.

10. In a gate-operating means, the combination with a post and gate pivoted thereto, of an operating-lever fulcrumed upon the post and operatively connected to the gate to swing the same, a curved track, a latch mounted at one end of the operating-lever and arranged to coöperate with the track to hold the gate in open and closed position, a catch pivoted to the said latch, a lifting-lever fulcrumed on the operating-lever and engaging said catch, and means to operate said lifting-lever to lift the latch and swing the operating-lever.

11. In a gate-operating means, the combination with a post and a gate pivoted thereto, of an operating-lever fulcrumed upon the post and operatively connected to the gate to swing the same, a curved track, a latch mounted at one end of the operating-lever and arranged to coöperate with the track to hold the gate in open and closed position, a spring-pressed catch pivoted to said latch, a lifting-lever engaging said catch, means to hold said lever and catch in engagement, and means to operate said lifting-lever to lift the latch and swing the operating-lever on its fulcrum.

In testimony whereof I affix my signature in presence of two witnesses.

GEORGE C. LANEY.

Witnesses:
   BYRON O. COLTON,
   GEORGE C. LANEY.